(12) United States Patent
Davies et al.

(10) Patent No.: US 8,563,244 B2
(45) Date of Patent: *Oct. 22, 2013

(54) MICROFLUIDIC DROPLET QUEUING NETWORK

(75) Inventors: Mark Davies, South Circular Road (IE); Tara Dalton, Patrickswell (IE); Julie Garvey, Ballinasloe (IE); Kieran Curran, Ballyclough (IE); Damian Curtin, Tralee (IE)

(73) Assignee: Stokes Bio Limited, Limerick (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,437

(22) Filed: Jul. 6, 2011

(65) Prior Publication Data

US 2012/0003658 A1 Jan. 5, 2012

Related U.S. Application Data

(63) Continuation of application No. 12/097,455, filed as application No. PCT/IE2007/000014 on Feb. 7, 2007, now Pat. No. 7,993,911.

(60) Provisional application No. 60/847,685, filed on Sep. 28, 2006.

(51) Int. Cl.
*C12Q 1/68* (2006.01)
*C12M 1/34* (2006.01)

(52) U.S. Cl.
USPC ........................................ 435/6.1; 435/288.5

(58) Field of Classification Search
None
See application file for complete search history.

(56) References Cited

U.S. PATENT DOCUMENTS

| 7,993,911 B2 * | 8/2011 | Davies et al. ............... 435/288.5 |
| 2004/0022686 A1 | 2/2004 | Charles et al. |
| 2006/0094119 A1 | 5/2006 | Ismagilov et al. |

FOREIGN PATENT DOCUMENTS

| EP | 1361442 | 11/2003 |
| GB | 2395196 | 5/2004 |
| WO | 01/01106 | 1/2001 |

* cited by examiner

*Primary Examiner* — Kenneth R. Horlick
*Assistant Examiner* — David Thomas

(57) ABSTRACT

A multi-port liquid bridge (1) adds aqueous phase droplets (10) in an enveloping oil phase carrier liquid (11) to a draft channel (4, 6). A chamber (3) links four ports, and it is permanently full of oil (11) when in use. Oil phase is fed in a draft flow from an inlet port (4) and exits through a draft exit port (6) and a compensating flow port (7). The oil carrier and the sample droplets (3) ("aqueous phase") flow through the inlet port (5) with an equivalent fluid flow subtracted through the compensating port (7). The ports of the bridge (1) are formed by the ends of capillaries held in position in plastics housings. The phases are density matched to create an environment where gravitational forces are negligible. This results in droplets (10) adopting spherical forms when suspended from capillary tube tips. Furthermore, the equality of mass flow is equal to the equality of volume flow. The phase of the inlet flow (from the droplet inlet port (5) and the draft inlet port (4) is used to determine the outlet port (6) flow phase.

15 Claims, 17 Drawing Sheets

MICROFLUIDIC DROPLET QUEUING NETWORK

FIELD OF THE INVENTION

The invention relates to control of flow of small discrete quantities of liquids ("droplets") at the microfluidic scale.

PRIOR ART DISCUSSION

There are many applications emerging for the use of flowing liquid droplets for uses such as chemical reactors. The liquid droplets may be controlled in such a way that they are separated from one another by an immiscible carrier oil which also wets the inner channel or tube surface. The droplets are thereby completely wrapped by the oil phase and any chemical interaction with the surface, including carryover and cross-contamination between droplets is eliminated.

It is known to provide droplets by, for example, segmenting a single phase homogeneous droplet into multiple smaller droplets of the same composition.

However the art provides little guidance for controlling flow of multiple droplets, particularly where droplets contain different chemical compositions. WO20051002730 describes a microfluidic device in which droplets are provided by shearing force between an aqueous liquid from a channel and oil flowing in the channel into which the aqueous liquid enters.

The invention is directed towards providing improved control of such droplets.

SUMMARY OF THE INVENTION

According to the invention, there is provided a microfluidic network for queuing a sequence of droplets in an immiscible carrier liquid, the network comprising:
- a draft conduit for flow of droplets with a carrier liquid;
- at least one liquid bridge in the draft conduit, the bridge having a chamber in which there is a draft inlet, a draft outlet, an inlet port, and a compensation port;
- wherein the inlet port is positioned for delivery of liquid to be queued into the draft conduit so that said liquid flows from the bridge in the carrier liquid in the draft conduit, and
- wherein the compensation port is positioned for withdrawal of carrier liquid to compensate for liquid added to the draft conduit via the inlet port.

In one embodiment, the compensation port is configured to provide a uniform target flow in the draft conduit.

In one embodiment, there are a plurality of bridges in the draft conduit and a liquid supply is connected to the inlet port of each bridge.

In one embodiment, the inlet port and the draft conduit are co-planar.

In one embodiment, the compensation port is at an angle to the plane of the inlet port and the draft conduit.

In one embodiment, the compensation port is at an angle of substantially 90° to the plane of the draft conduit and the inlet port.

In one embodiment, the draft conduit inlet and an outlet to the bridge are at approximately 120° to each other and the inlet port is in-plane with the draft conduit and at an angular separation of 120° from each of the draft inlet and outlet.

In one embodiment, there are a plurality of draft conduits in parallel

In one embodiment, the bridge inlet port diameter is in the range of 0.1 mm to 0.6 mm.

In one embodiment, the bridge compensation port diameter is in the range of 0.1 mm to 0.6 mm.

In one embodiment, the separation of the compensation port from the axis of the draft conduit is in the range of 2 mm to 8 mm.

In one embodiment, the network further comprises a segmenter for segmenting a large droplet or a stream into droplets and for delivering said droplets to the inlet port of the bridge.

In one embodiment, the segmenter comprises a bridge having a chamber with an inlet and an outlet, and said inlet and outlet are configured so that a droplet temporarily adheres to the inlet and transfers to the outlet when it becomes unstable.

In one embodiment, the segmenter comprises a chamber for containing carrier liquid in the space between the inlet and the outlet.

In a further embodiment, the network comprises a plurality of bridges in the draft conduit, at least one of said bridges being a mixing bridge downstream of at least one other bridge, the mixing bridge comprising means for mixing a droplet with a droplet flowing in the draft conduit.

In another embodiment, the mixing bridge comprises an inlet port for an added droplet, configured for formation of droplets within its chamber, for contact and mixing of said droplets, and for transfer of the mixed droplet to the draft outlet.

In one embodiment, the mixing bridge chamber is configured to fill with carrier liquid to surround the droplets in the chamber.

In one embodiment, said supply comprises a well and a manifold for delivering droplets from the well to a plurality of bridges.

In one embodiment, the network further comprises an infusion pump for delivering carrier liquid to the manifold.

In one embodiment, the bridges and the draft conduit are arranged in an array and there is a well adjacent each bridge.

In one embodiment, said wells are arranged in a pattern of an assay well plate.

In a further embodiment, there are a plurality of wells and associated manifolds, and they are arranged for delivery of droplets of different types to the bridges to achieve a serial flow of droplets of different types in the draft conduit.

In one embodiment, the bridges are arranged so that droplets are added simultaneously at spaced-apart locations along the draft conduit.

In a further embodiment, the length of conduit between said supply and each bridge is chosen according to modelling of an electric circuit, in which conduit length is equivalent to electrical resistance In another aspect, the invention provides a method for managing a queue of droplets in any network as defined above, the method comprising delivering a sequence of droplets flowing in carrier liquid to each bridge so that said droplets are added to carrier liquid in the draft conduit, carrier liquid is withdrawn via the compensation port of each bridge to compensate for added liquid, and the separations of the inlet droplets are sufficient to achieve an adequate separation of droplets in the draft conduit.

In one embodiment, there are a plurality of bridges in the draft conduit, and droplets of the same type are added substantially simultaneously to the draft conduit via the bridges so that there is a sequence of droplets of similar type in the draft conduit.

In one embodiment, droplets of different types are added substantially simultaneously to the draft conduit, providing a sequence of droplets of selected different types in the draft conduit.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

If liquid droplets are added to a tube or channel at different axial locations then the flow rate and velocity would increase in the flow direction, giving an undesirable summing of flow rates when queuing a number of droplets. To overcome this, equal volumes of liquid are added and subtracted simultaneously to keep the axial velocity in the queuing tube constant. A droplet network has bridges such that wherever a droplet is added to a draft flow excess carrier liquid (silicone oil) is removed via a compensating port. An aqueous phase entering from an inlet port will be delivered to an exit port, likewise for an aqueous phase arriving at an upper inlet port. By this means aqueous droplets can be introduced into the draft stream and delivered straight through all of the downstream bridges. In a single device, with steady inlet flows, a queue of droplets can be formed and delivered. Furthermore, a downstream segmenter can then be used to break a stream of droplets into droplets of a different size.

Figure 1:
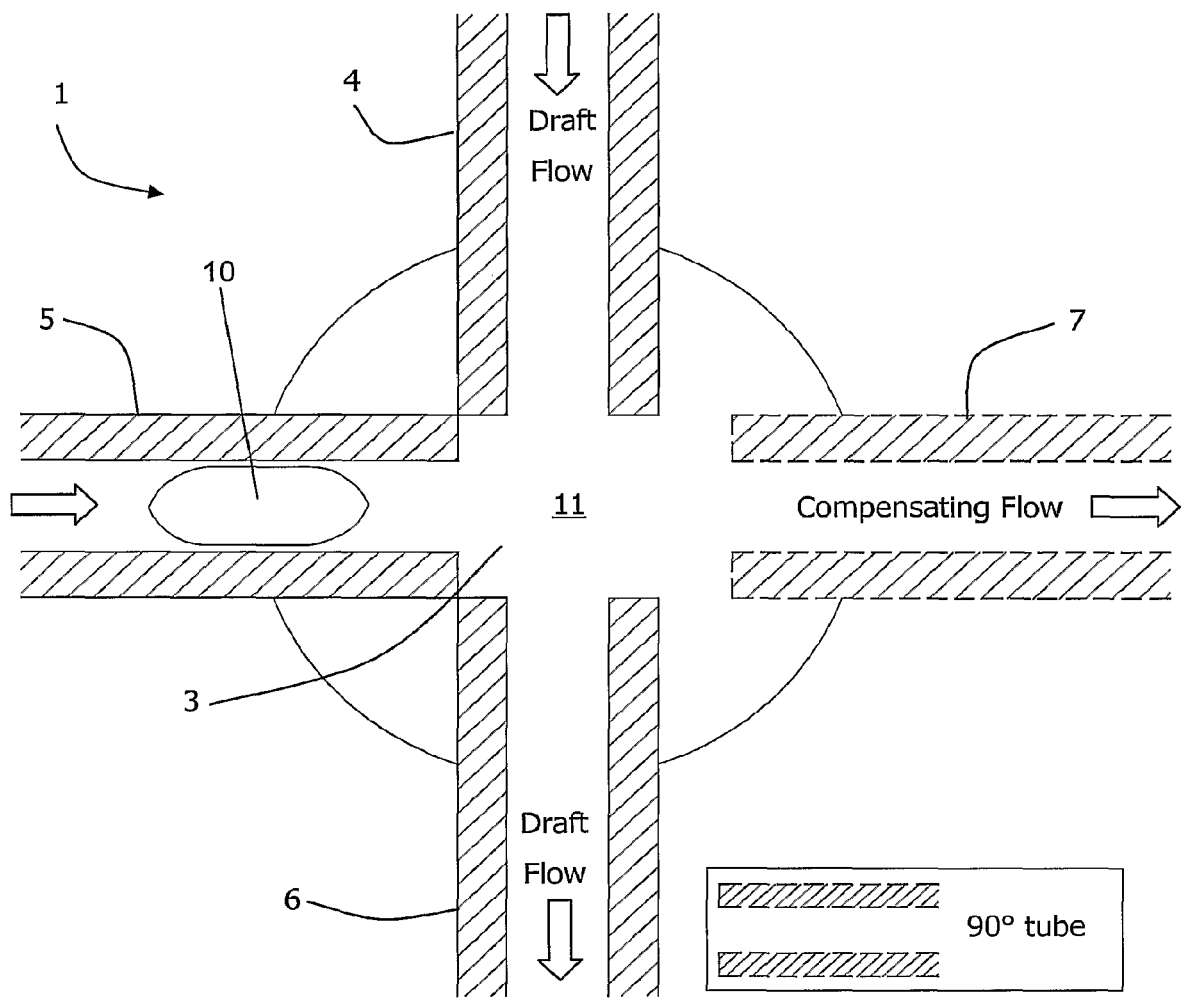
FIG. 1 is an illustration of a multi-port liquid bridge of a liquid droplet network.

A multi-port liquid bridge 1 is illustrated in FIG. 1. Arrows indicate flow direction. Aqueous phase droplets 10 are distinctly shown with an enveloping oil phase carrier liquid 11, implied in all of the drawings. A chamber 3 links four ports, and it is permanently full of oil 11 when in use. Oil phase is fed in a draft flow from an inlet port 4 and exits through a draft exit port 6 and a compensating flow port 7. The oil carrier and the sample droplets ("aqueous phase") flow through the inlet port 5 with an equivalent fluid flow subtracted through the compensating port 7. The latter is perpendicular to the plane of the page, and the manner of representing this used in FIG. 1 is also used in the remainder of the drawings.

The ports of the bridge 1 are formed by the ends of capillaries held in position in plastics housings, as described in more detail below. In one embodiment the inner diameter of the chamber is 2.4 mm and the height of the chamber is 2.5 mm. The ports 4-7 are 0.4 mm in diameter and generally in the order of 0.1 to 0.6 mm in diameter.

The phases are density matched. Density matching creates a near weightless environment where gravitational forces are negligible. This results in droplets 10 adopting spherical forms when suspended from capillary tube tips. Furthermore, the equality of mass flow is equal to the equality of volume flow. The phase of the inlet flow (from the droplet inlet port 5 and the draft inlet port 4) is used to determine the outlet port 6 flow phase.

Figure 2:
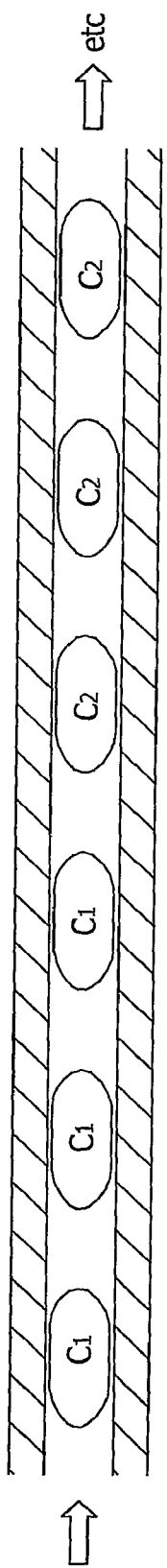
FIG. 2 shows queuing configuration of droplets in a tube in which droplets are grouped into sets of similar chemistry.
Figure 3:
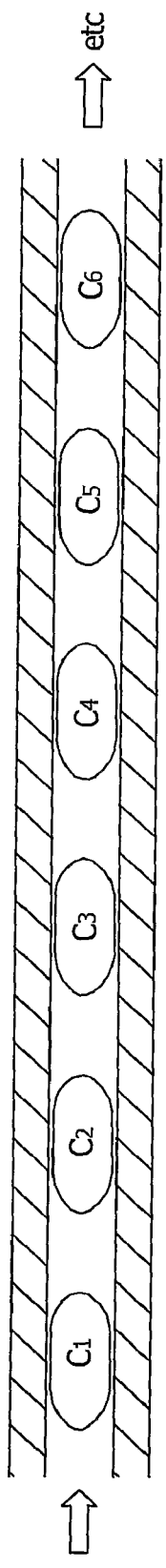
FIG. 3 shows queuing configuration of droplets in a tube in which droplets of different types are arranged in sequence.
Figure 4:
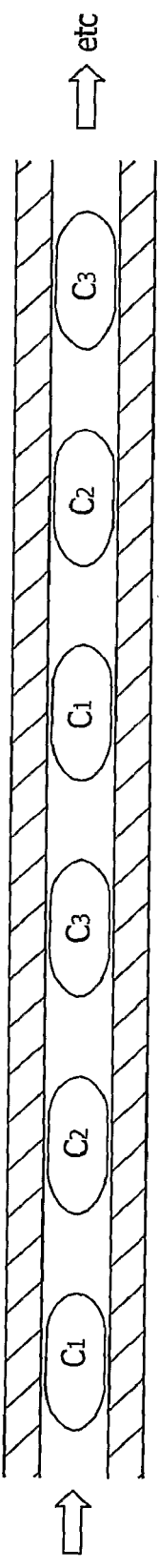
FIG. 4 shows queuing configuration of droplets in a tube in which droplets are arranged in repeat sequence.

FIG. 2, FIG. 3 and FIG. 4 represent a range of queuing configurations of droplets in a tube. FIG. 2 shows droplets grouped into sets, FIG. 3 shows droplets arranged in sequence, and FIG. 4 shows droplets arranged in repeat sequence.

Figure 5:
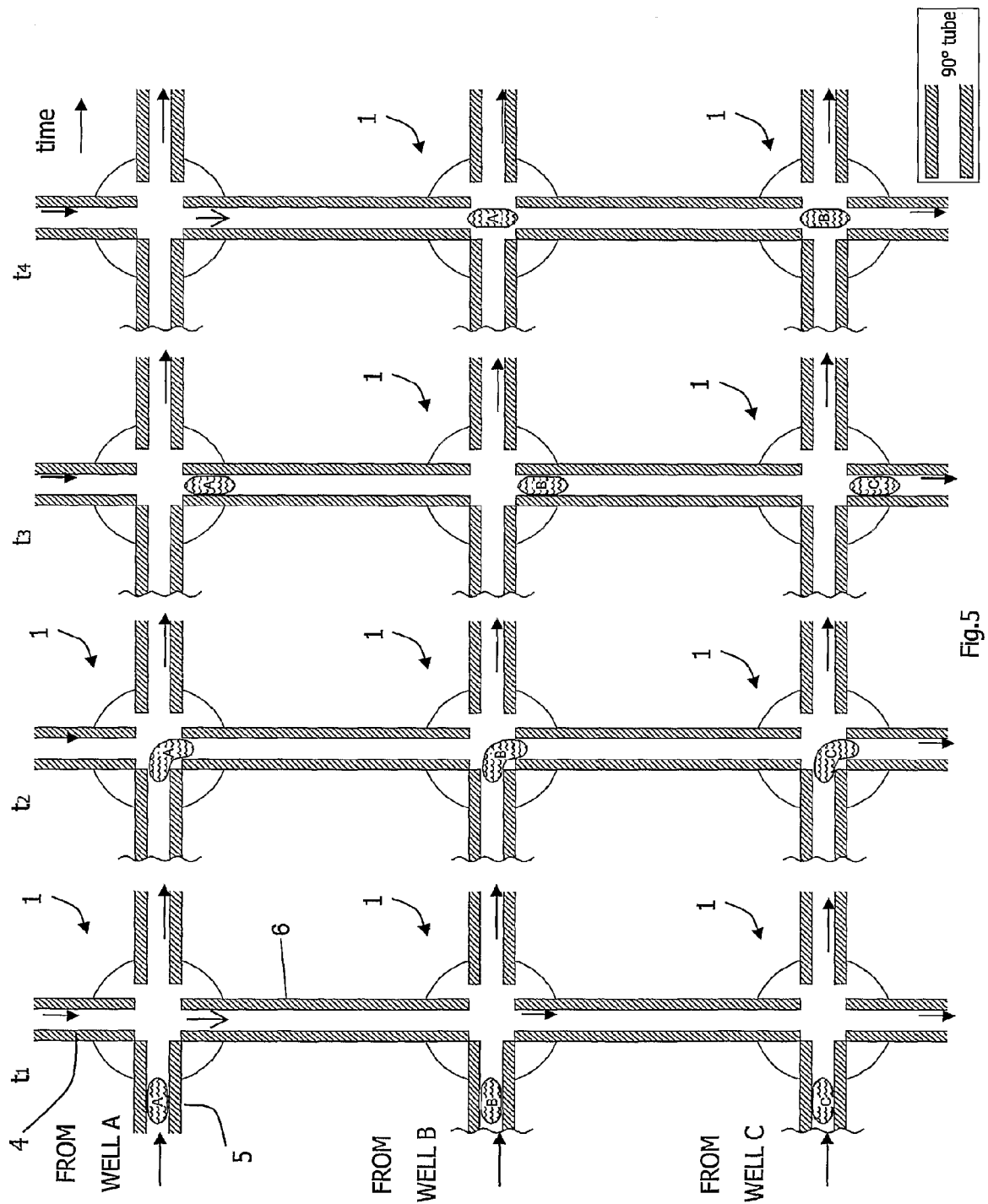
FIG. 5 shows time progression, left to right, of a queue formation of droplets with different chemistry in each.

A queuing network is illustrated in FIG. 5, which shows a column of three bridges 1 at four instances in time, left to right. At a time $t_1$ the droplets taken from a well are approaching the bridges from the left inlet port 5 in phase. At time $t_2$ the droplets bridge to the lower port 6. The compensating port 7 is out of plane and too far from any inlet to bridge with the droplets, it therefore only takes the oil phase. At time $t_3$ the droplets are shown queued in the draft tube. At time $t_4$ the inlet port 4 is shown bridging with the outlet port 6, and therefore any droplet that enters from the top, or from the left, always exits from the exit port 6. A queue of different droplets of the aqueous phase is thereby formed. Operation of the compensating port 7 ensures uniformity of flow down through the draft conduits 4, 6.

Figure 6:
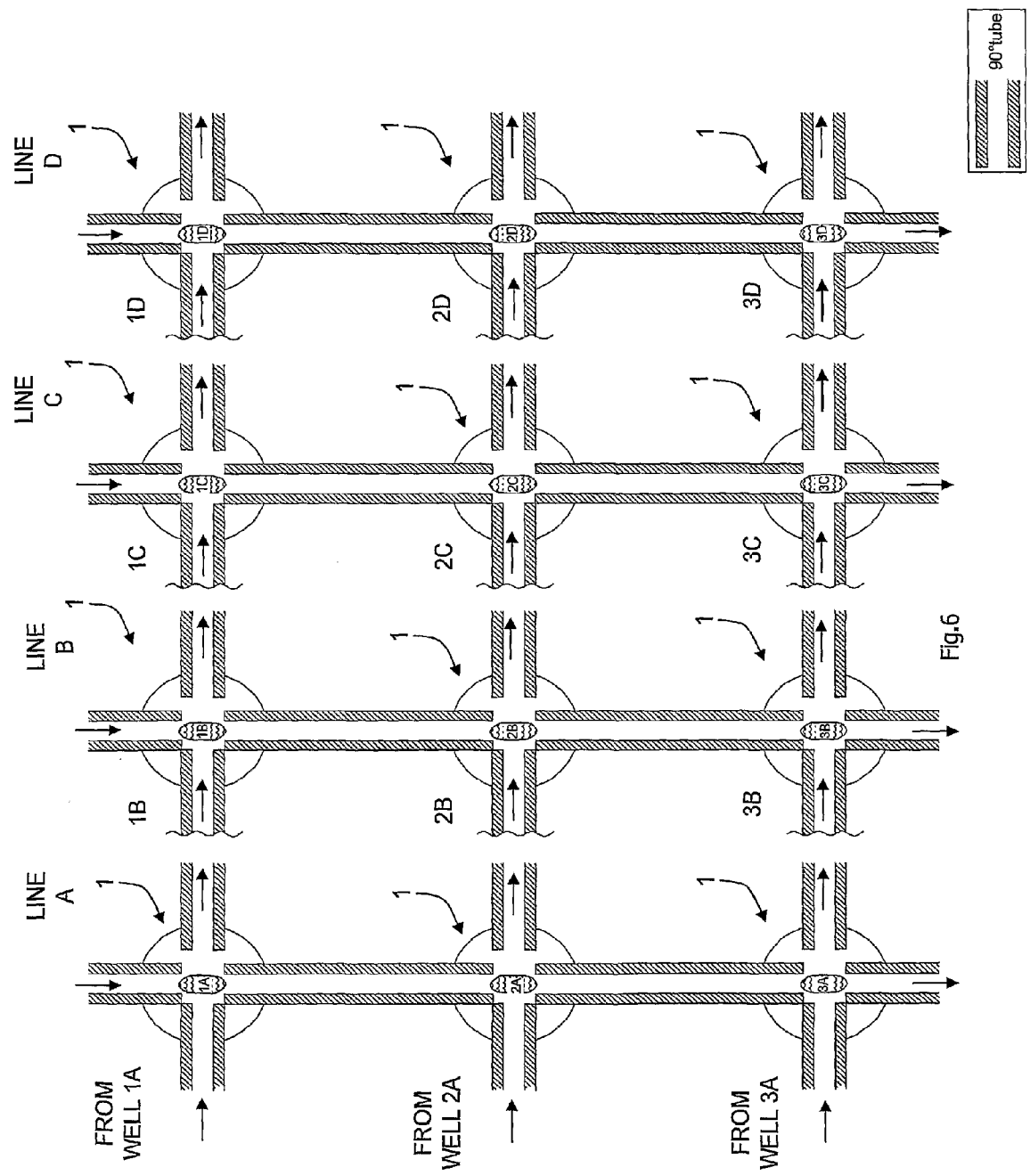
FIG. 6 shows queuing of different droplets formed in identical parallel lines.

Many lines can be configured in parallel as shown in FIG. 6 to give a high-throughput system. This is particularly useful for managing queuing of droplets as micro-reactors for thermal cycling through multiple thermal cyclers in parallel. This is very advantageous for achieving a high throughput, and it avoids need to cyclically heat and cool reaction vessels.

Figure 7:
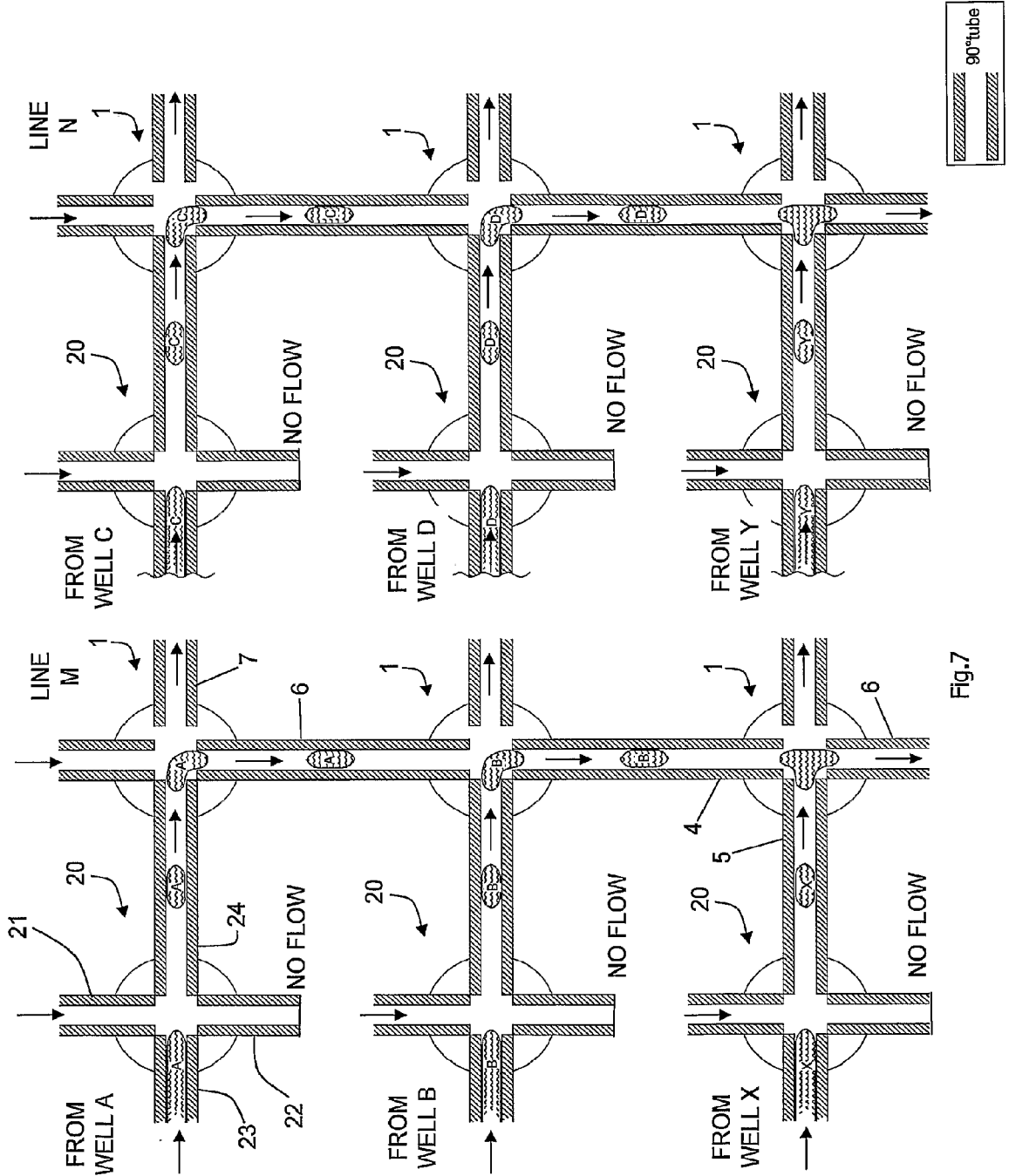
FIG. 7 shows a queuing system having an upstream liquid bridge segmenter to form droplets, queuing bridges, and a downstream bridge mixer to add chemistry to each of the queued droplets.

A network which performs segmentation of a continuous aqueous phase into droplets, and also queuing and mixing of the droplets, is shown in FIG. 7. This embodiment shows how the queue bridge configuration of FIG. 5 can be integrated with other bridges, and how this network can be arranged in parallel. In the arrangement of FIG. 7 there are segmentation bridges 20 having ports 21 to 24, but only ports 21, 23 and 24 are operational as there is no flow through port 22. The bridges 20 are arranged upstream of the queuing system, one for each well, to segment the continuous phase drawn from a well. The segmentation is achieved by a droplet forming within a chamber between the ports 23 and 24, and due to inter-facial tension and immiscibility between the aqueous and oil phases, breaking off and entering the port 24.

A single bridge 1 operating as a mixing bridge is arranged downstream of each draft flow, so that a single phase from a well X is segmented and then mixed with each of the queued droplets A B, . . . in succession in the mixer bridge 1. The mixer bridges 1 are arranged so that there is simultaneous arrival of droplets at them. This will also work if the phase from well X is continuous. Within each mixer bridge, droplets form at the ends of the ports 4 and 6, they mix due to their internal pressures and inter-facial tension, and the mixed droplet exits via the exit ports 6.

The end result is the delivery of a queue of mixed droplets which flow downstream to be further processed by, for example, a thermal cycler. An application of this is the arrangement of primers in a well for queuing, then the addition of a patient's sample along with the other required premix occurring in the mixer. A continuous thermal cycler for DNA amplification using the polymerase chain reaction (PCR) may be downstream from the mixers.

Figure 8:
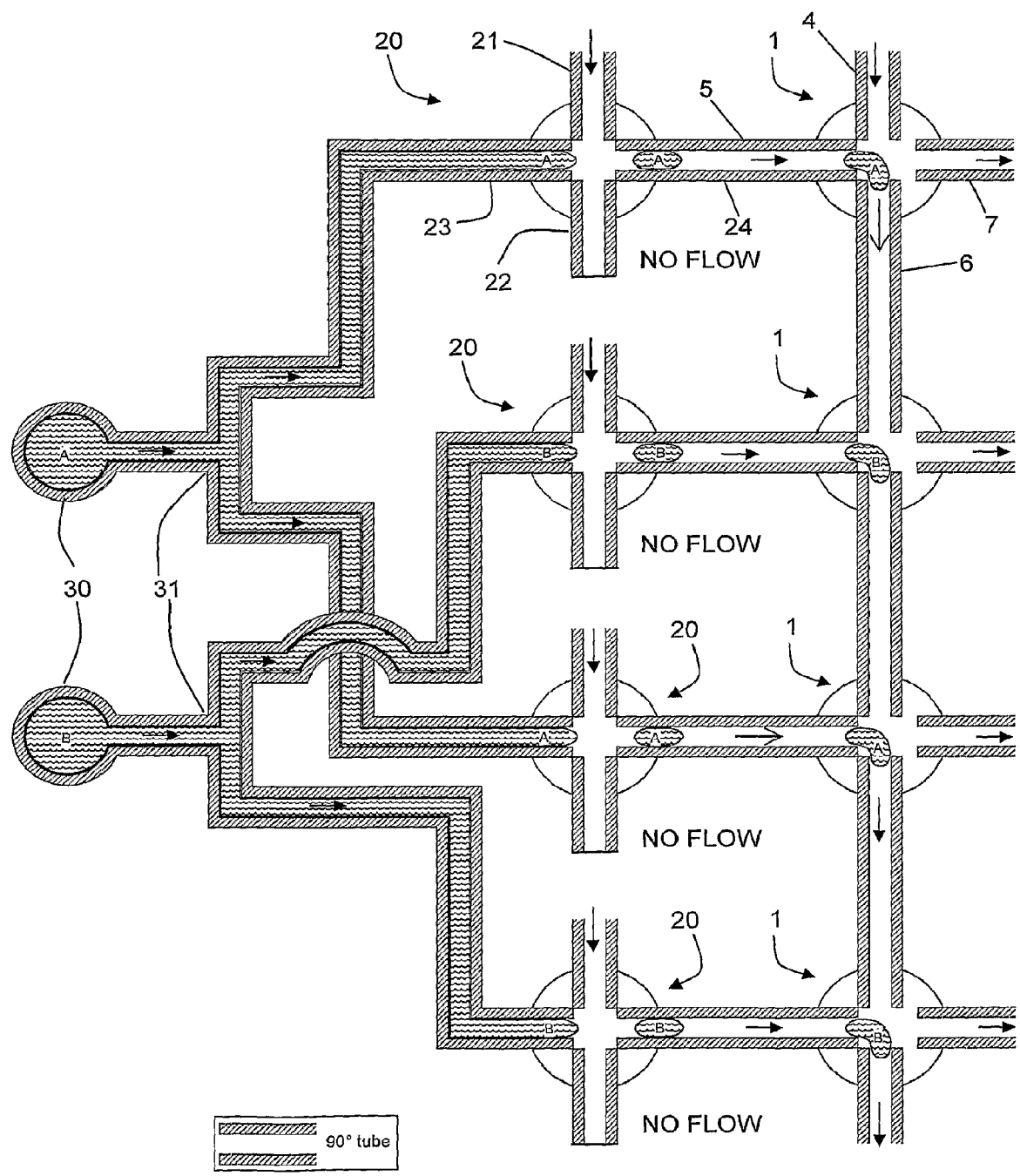
FIG. 8 shows network having wells, manifolds, segmenter bridges, and queuing bridges to produce a queue of droplets with different chemistry in each.

Referring to FIG. 8, a network has two wells 30 and manifolds 31 to produce a queue of droplets with alternative chemistry in each. The manifolds 31 distribute the flow to segmenter bridges 20 so that each line carries the same flow rate. Downstream of the segmenter bridges 20 are the queue-bridges 1 which operate in the same way as those shown in FIG. 5.

Figure 9:
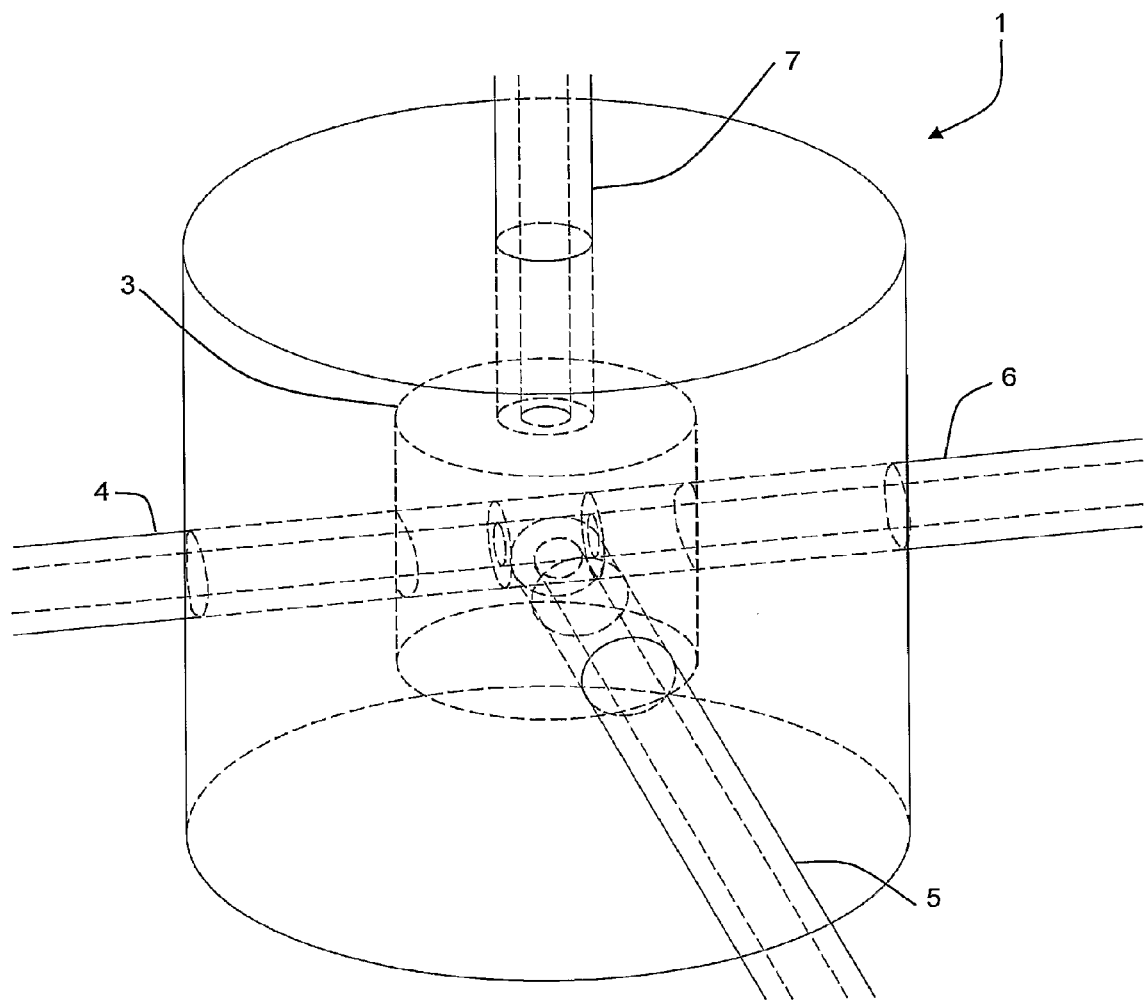
FIG. 9 shows the physical construction of the bridge of FIG. 1.

FIG. 9 is a three dimensional view of the bridge 1. The bridge chamber 3, the upper draft inlet 4, left droplet inlet port 5, lower draft exit 6 and the compensation port 7 are all clearly illustrated. The outer cylinder is a solid plastics wall, in this case polycarbonate.

Figure 10:
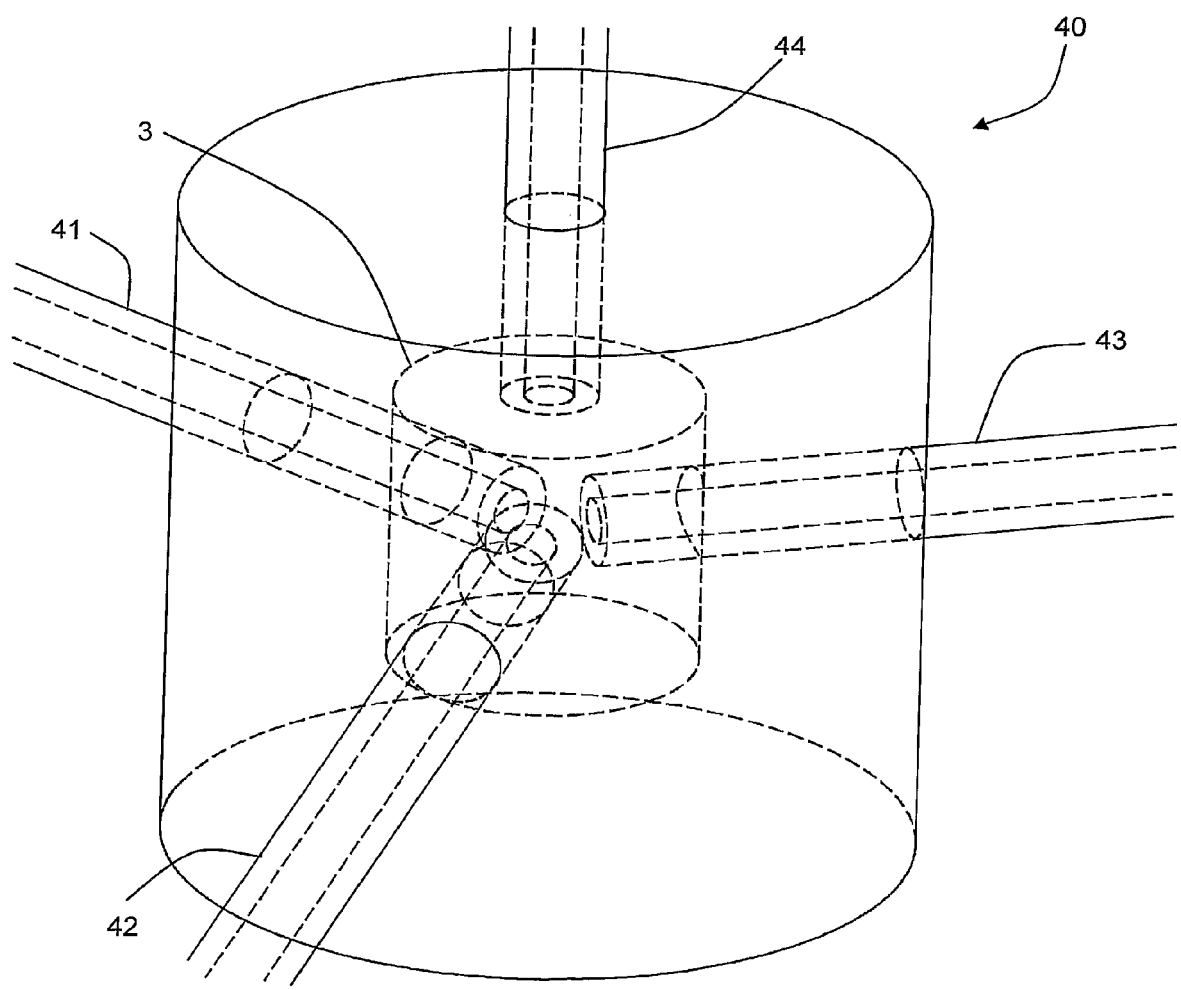
FIG. 10 shows a bridge having three in-plane with three ports at 120° to each other and a compensating port at 90° to this plane.

However, other configurations are possible, and FIG. 10 illustrates one example in which three in-plane ports 41, 42 and 43 are at an equal angular separation of 120°, and the compensating port 44 is again at 90°.

In one embodiment the tubing used for the fluid flow has an exterior diameter of 0.8 mm and an interior diameter of 0.4 mm, the distance between bridges is 9 mm, the bridge chamber is of diameter 2.4 mm, and the outer diameter is approximately 6 mm.

In one embodiment, the flow rates and droplet volumes for the apparatus as follows, with reference to the bridge 1: flow rate in the draft inlet 4, the droplet inlet 5, the draft exit 6, and the compensating exit 7 are all equal (i.e. $q_4=q_5=q_6=q_7$); the sum of the inlet flow rates is also equal to the sum of the outlet flow rates ($q_4+q_5=q_6+q_7$); droplet or plug volumes are between 30-300 nl; and volumetric flow rate is 3 µl/min with velocities of the order 1 mm/s. These are the conditions used when the queue is used to array primers upstream of a PCR DNA amplifier.

A network may segregate primers into a controlled and orderly flow of droplets. Multiple wells of differing primers feed into a single tube of main fluid flow. With an applied force to the primers in each well, a set of primer droplets will be formed at each bridge in the tube of main fluid flow. This can be used to give a very consistent and predictable flow of queued primer droplets. It will be appreciated that multiple wells in multiple parallel tubes of fluid flow can achieve a large number and/or arrangement of differing primers. A number of well array plates can be used in parallel to acquire a sufficient number of primers for a required DNA test. Groups of multiple droplets (approximately 10) are used to increase the sample size and thus increase the certainty of the final test results. The queuing system receives fluid flow from the infuse manifold of the pumping system, flows through a distribution head into a queuing cartridge and fluid is then withdrawn from the queuing cartridge, through the distribution head and back to the withdrawal manifold of the pumping system.

Figure 11:
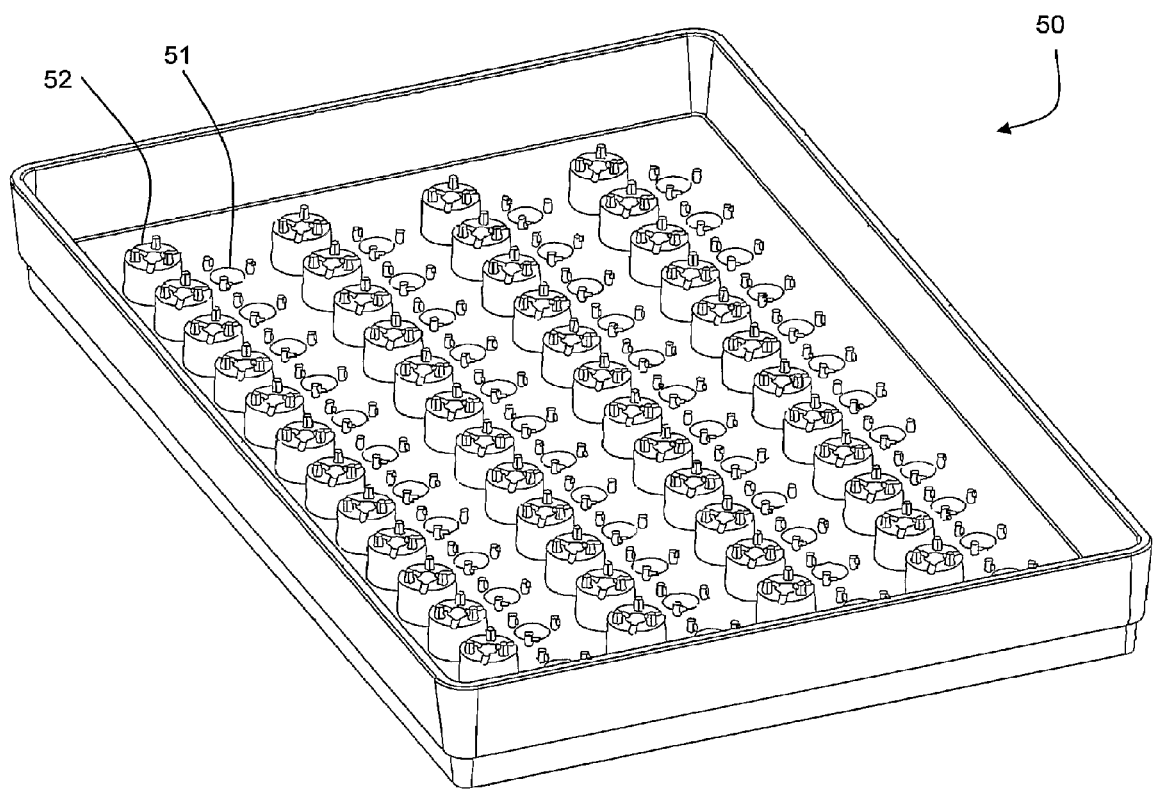
FIG. 11 is an external perspective view of an array plate of a network.
Figure 12:
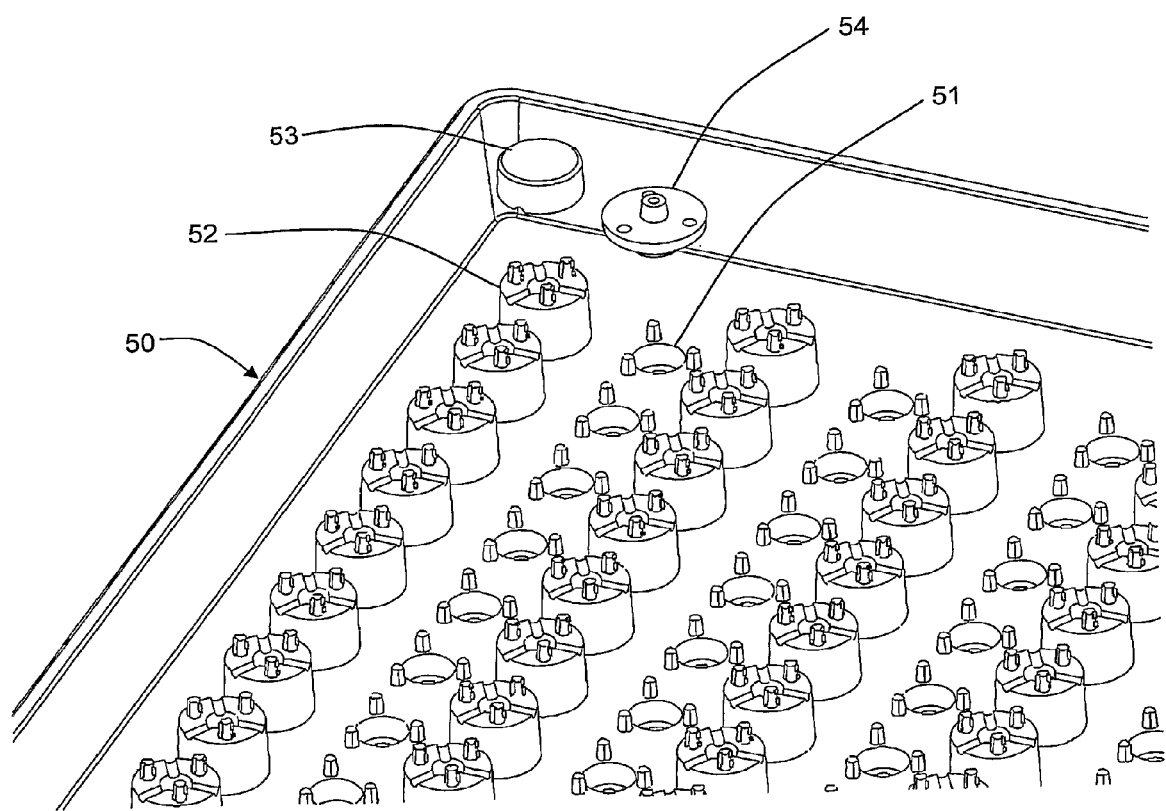
FIG. 12 shows junction caps and a fluorinated ethylene propylene (FEP) well inserts of the well plate.
Figure 13:
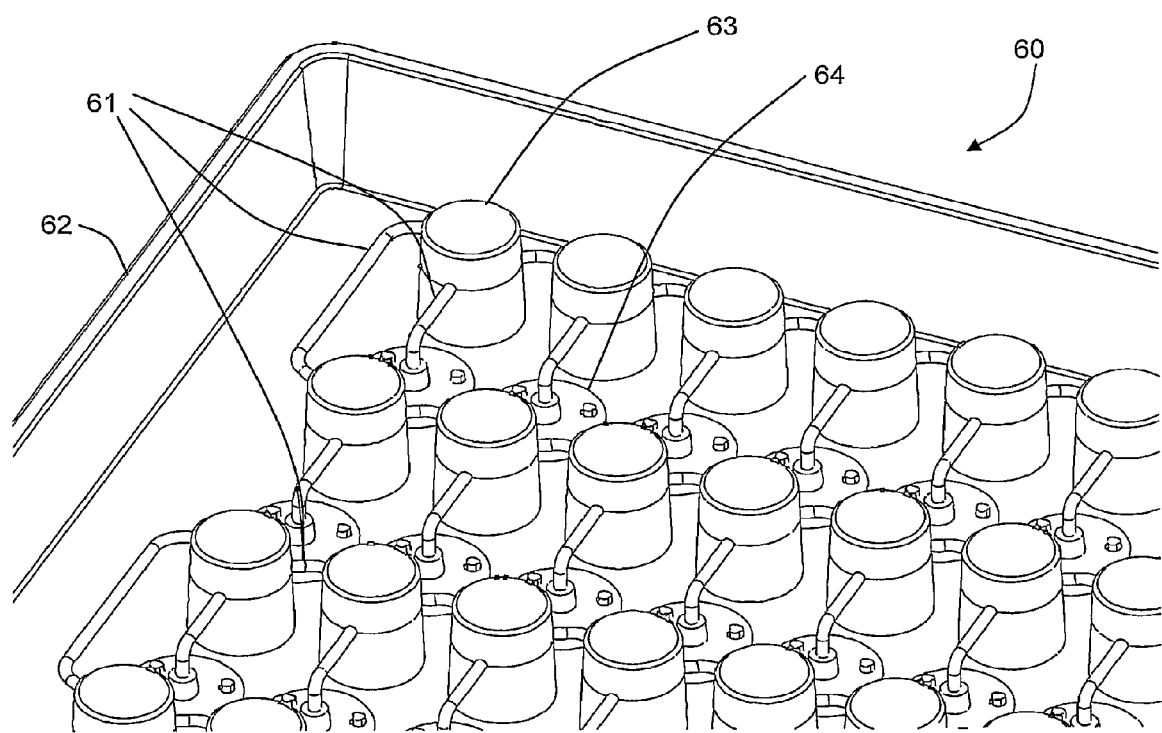
FIG. 13 is a more detailed perspective view.

As illustrated in FIGS. 11 and 12 a plate 50 has integrally mounded bases 51 for wells and 52 for bridges. A cap 53 is provided to complete a bridge 63 (shown in FIG. 13) and a well insert 54 is provided to complete each well 64 (also shown in FIG. 13). FIG. 13 shows capillaries 61 interconnecting the wells 64 and the bridges 63, all in a queuing network cartridge 60. The draft flow is along each line of bridges 63. The overall configuration mimics that of a conventional 96-well assay plate, and so samples can be dispensed by conventional dispensing equipment onto the wells 51. The cartridge 60 consists of fluoropolymer tubing 61 and three injection moulded parts: a polycarbonate array plate 62, 48 polycarbonate caps 53 and 48 fluorinated ethylene propylene (FEP) wells 54. All parts are manufactured using standard injection moulding. Gate and ejector pin locations were placed at sites that did not interfere with the operation of the components. A flatness tolerance of 200 micrometers was applied to the upper face of the array plate to ensure a uniform interface with mating fluidic ports.

Figure 14:
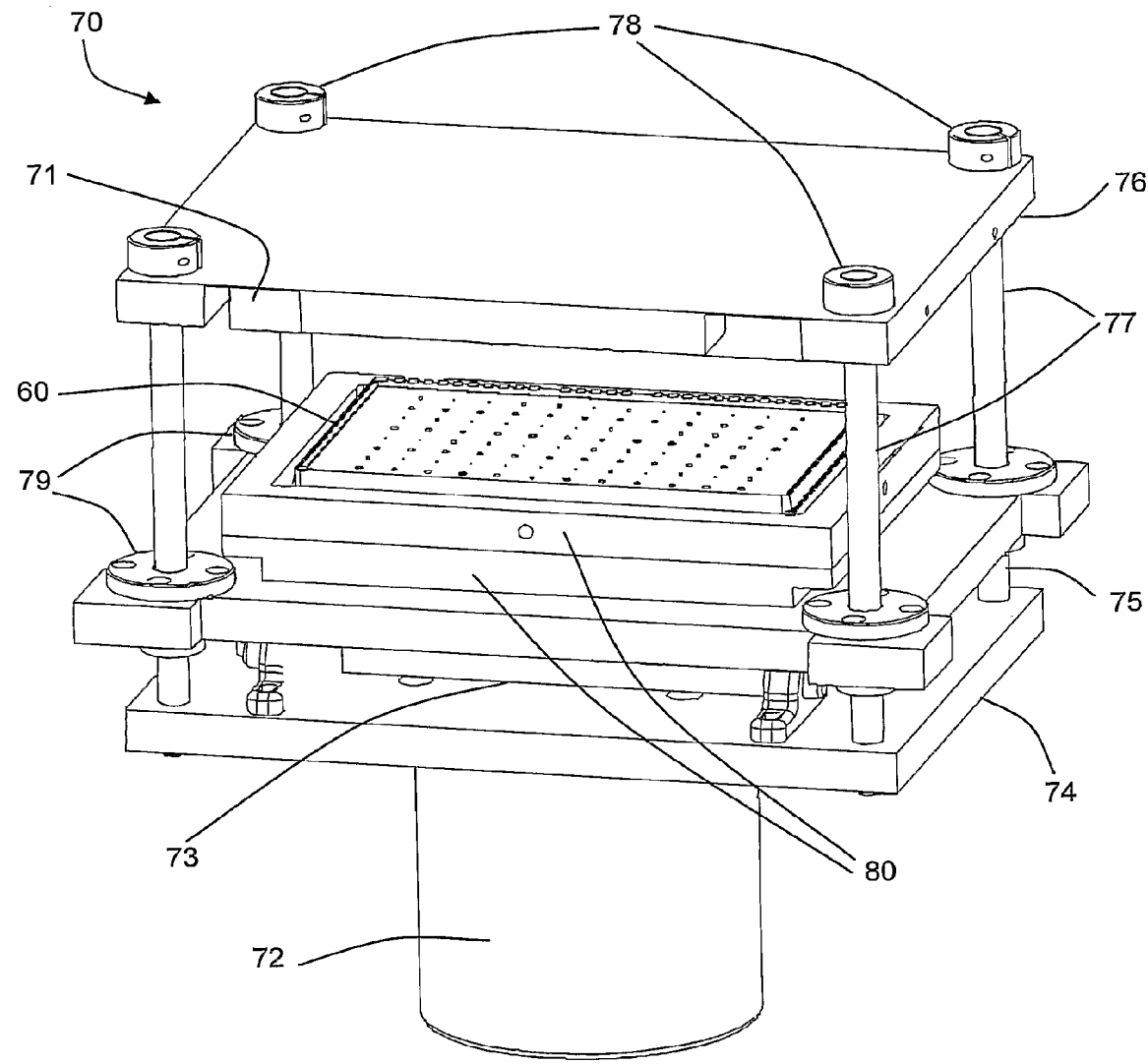
FIG. 14 is a perspective view of a full microfluidic system.

A complete microfluidic system is depicted in FIG. 14. A distribution head 71 containing mating ports is milled from polycarbonate. A very tight flatness tolerance is applied to the lower surface of the distribution head 71 in order to mate with the upper surface of the array plate 60. A stepper motor 72 with gearing 73 which is situated on a gear train mount 74 is used to drive a cradle base 75 containing the queuing cartridge 60 against a support head 76 containing the distribution head 71. By doing so the necessary connections are made between the queuing cartridge 60 and the distribution head 71. The gear train mount 74, the cradle base 75 and the support head 76 are all made from aluminium. Steel bars 77 and collars 78 are used to position the plates and act as guides. Bearings 79 on the cradle base 75 allow for motion to and from the distribution head 71. The queuing cartridge sits on a cradle 80 which is fitted onto the cradle base. The cradle 80 is a two-part piece with the top half manufactured from polycarbonate and the bottom half manufactured from aluminium. The rotational force of the motor 72 is converted to an upwards force acting on the array plate through a gear and cam mechanism 73

Assembling the queuing cartridge 60 involves fastening the polycarbonate caps 53 and the FEP wells 54 to the appropriate locations. Contact between mating parts is made via a compression press-fit between the pins on the array plate 60 and the holes on the well and caps. Short lengths of rigid PEEK tubing are then inserted into the withdrawal ports of the array plate. These lengths of tubing provide a cylindrical geometry for spacing the tubing tips. The microfluidic network of tubing 61 is then formed by placing tubing in the appropriate ports. The tubing 61 connecting each bridge typically measures 8 mm. The tubing 61 connecting the wells to the bridges typically measures 12 mm. Sealing of the tubing network is achieved with the use of a poly dimethyl siloxane (PDMS) encapsulant. This encapsulant is mixed as a two-part resin, degassed in a vacuum chamber and poured into the array plate cavity. The assembly is then cured in an oven at 80° C. for 1 hour. The cured encapsulant forms an elastomeric seal to ensure primer and oil flow only through tubing and not between array plate-tubing interfaces. Finally, the PEEK tubing used to space the tubing tips is removed.

Assembly of the distribution head involves the connection of tubing to the appropriate connectors. Again sealing of the tubing network is achieved with the use of a poly dimethyl siloxane (PDMS) encapsulant. The same method of mixing, pouring and curing of the PDMS as mentioned above is used.

The distribution head performs the task of distributing the flow from the 48 tubes of the manifold system to the top of the wells on the queuing cartridge. This fluid flow from the manifold system, through the distribution head to the top of the well, is used to pump the primer from the wells down the connecting tubes and into the bridges.

The assembled queuing cartridge 60 and distribution head 71 are primed with AS100 silicone oil prior to first use. This step removes trapped air from tubing and liquid bridge cavities. Primer is then loaded into wells of the queuing cartridge via a standard pipette. The pipette tip is submerged under the level of the oil and in contact with the throat of the well such that the sample is transferred directly into the tubing. Any backflow thereafter is accommodated by the expanding conical section of the wells. Care must be exercised not to introduce large quantities of air into the tubing after the primer has been infused. The cartridge is then ready to be loaded into the cradle with the distribution head to be loaded into the support head.

The queuing cartridges 60 are designed to supply enough primer for a number of tests. After the cartridge is depleted of primers, either a new cartridge can be used or the old cartridge can be refilled. The distribution head, platform plates and motor system are all permanent features of the system.

There are many ways of pumping fluid through the system. A singular plate with indentations can be used to feed oil flow into the queuing cartridge. By placing the plate in a bath of oil into the queuing system, the compression force applied to the queuing system can create a constant fluid flow. Also a multiple syringe system can be applied in order to get a multiple fluid flow through tubing into the queuing system. However the current design uses syringe pumps to deliver the necessary flow to the input lines of the queuing system. It is done either directly or by back-pressuring a storage well. For the multiple line fluid flow a limited number of syringes are used to pressurize a reservoir or manifold with many outlets. A Harvard pump with stepper-motor drive is used to drive the limited number of syringes.

Figure 15:
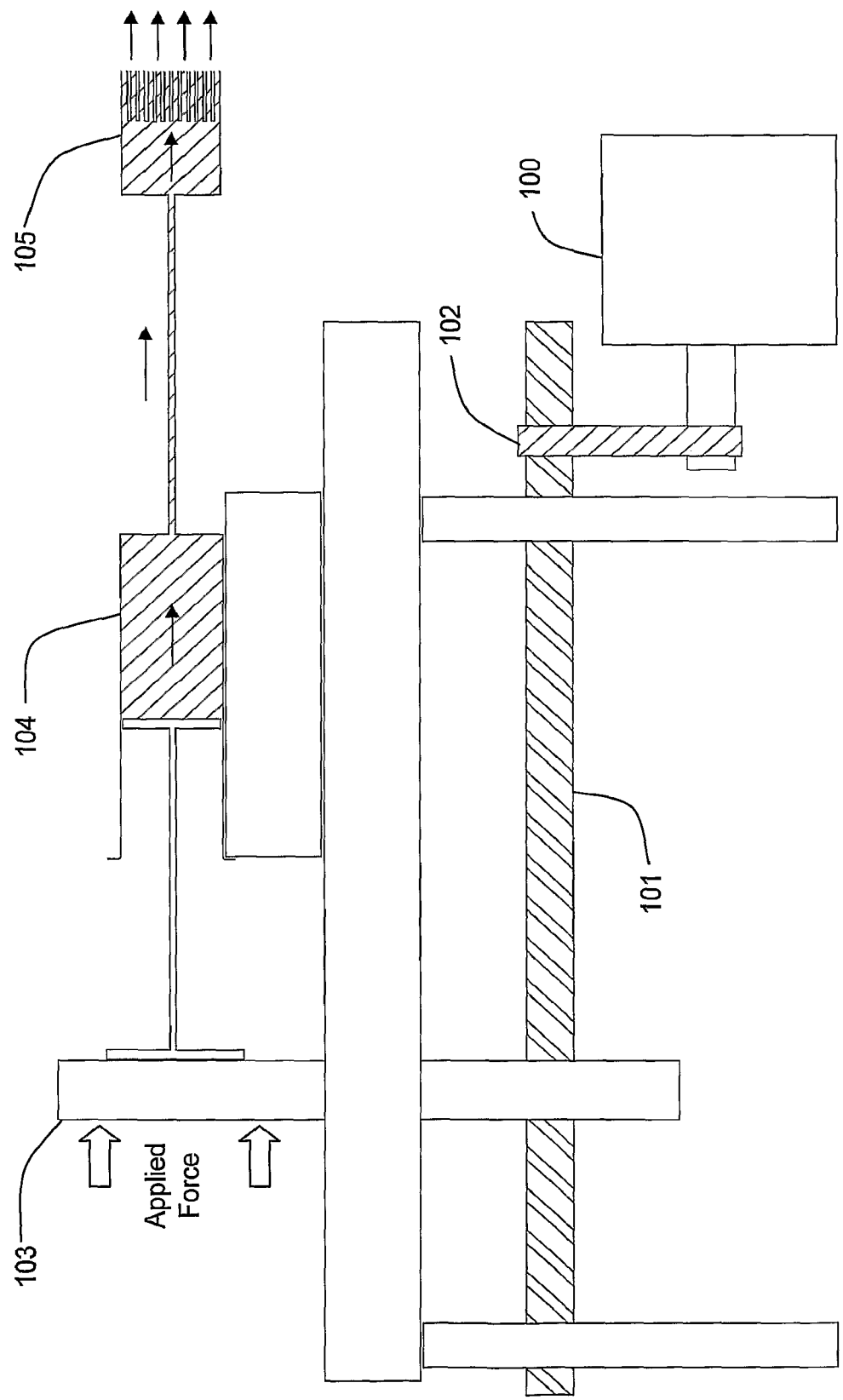
FIG. 15 shows a syringe pump system which supplies the system with fluid flow.
Figure 16:
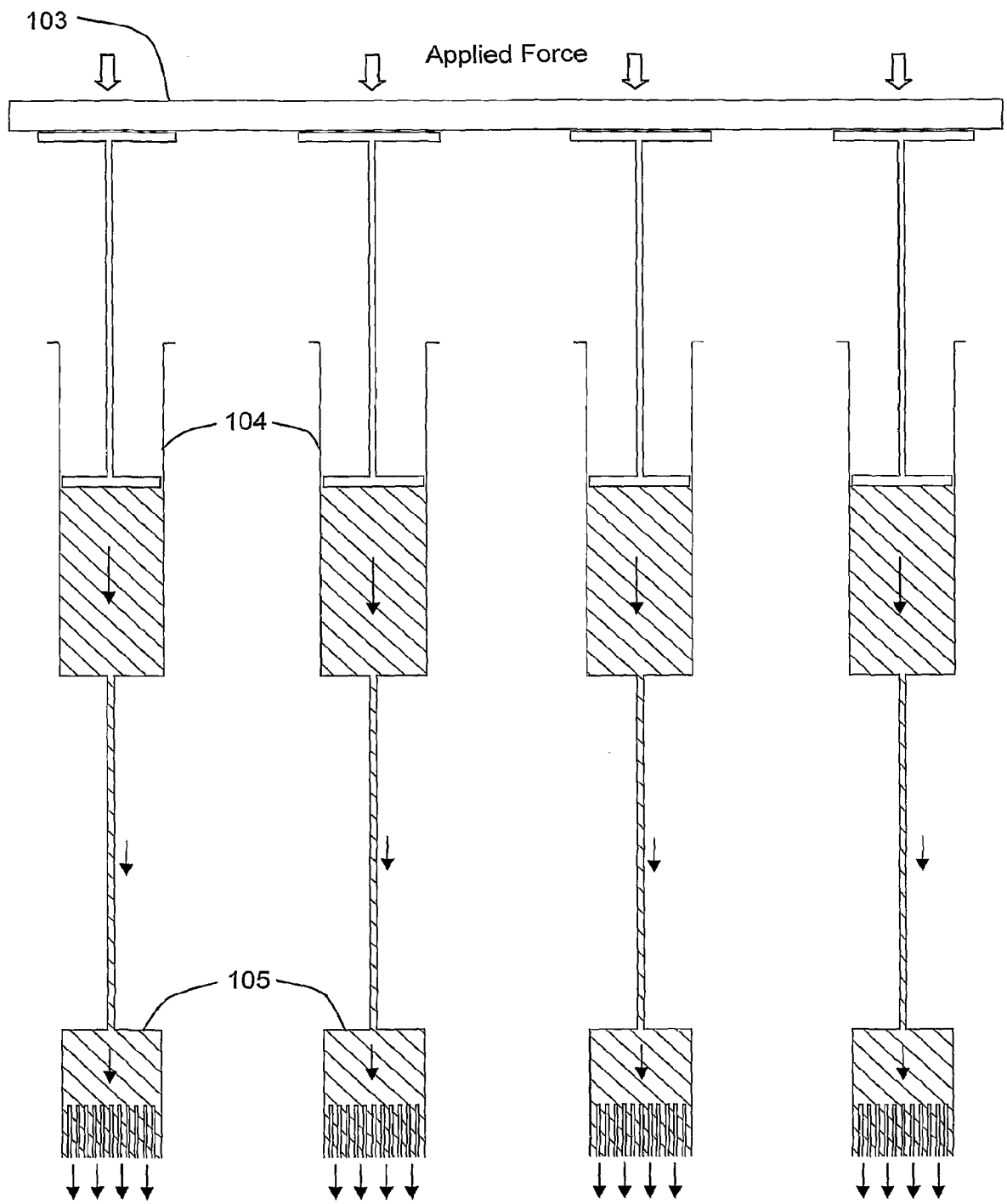
FIGS. 16 and 17 shows a multiple syringe and manifold infuse array in use.
Figure 17:
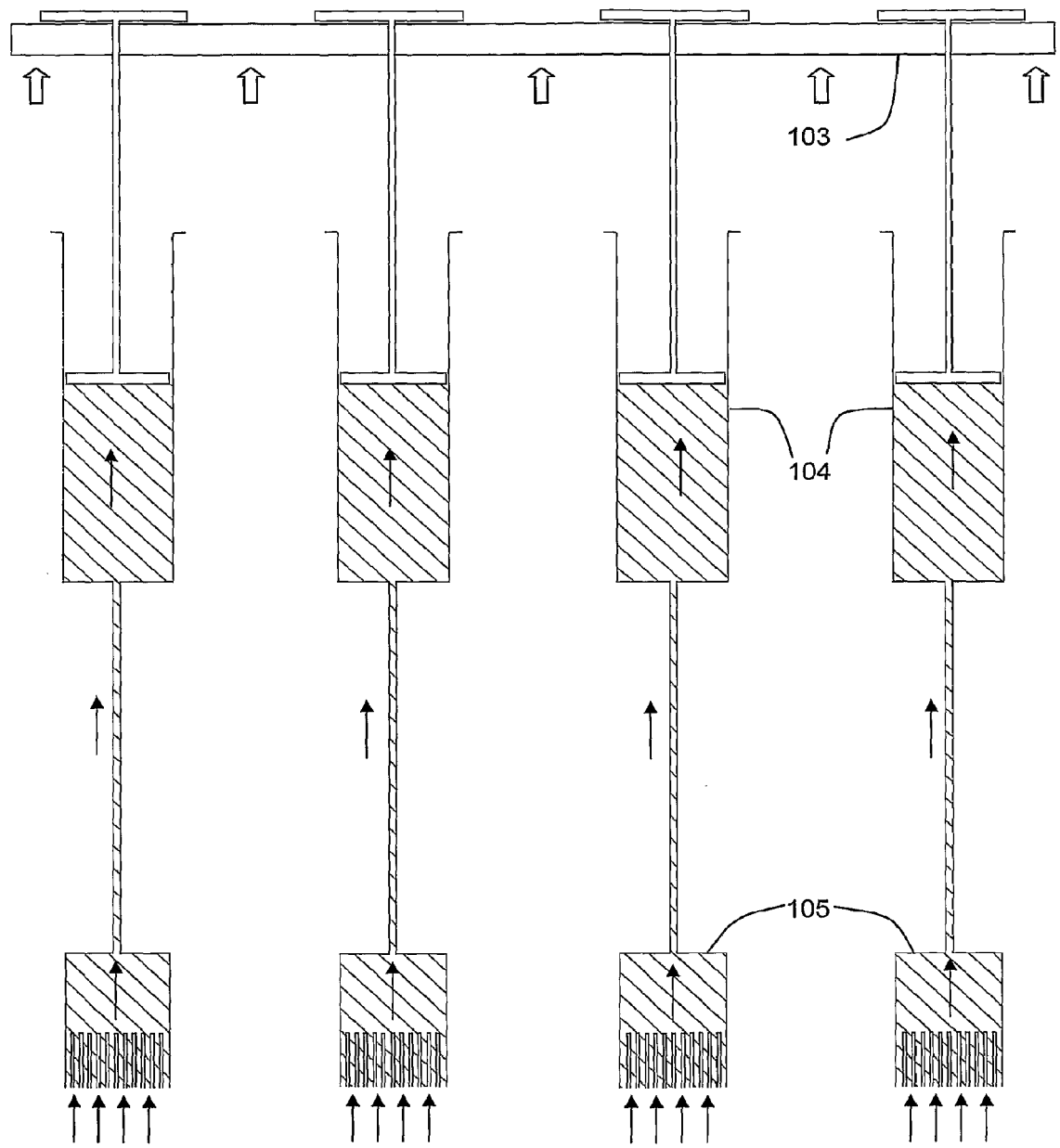

Motor systems as shown in FIG. 15 give a constant feed rate to infuse and withdraw oil phase from the queuing system 70. The motor is a stepper motor 100 driving a lead screw 101 via a belt 102. The rotating lead screw drives a pusher block 103 which in turn applies a constant velocity to the syringes 104. The constant flow from the infuse syringes is pumped through manifolds 105 as depicted in FIG. 16 which will separate the fluid flow into multiple tubes with equal flow rates. The fluid flow then enters the queuing system. The fluid is then withdrawn at the same flow rate using a similar motor system in reverse. A manifold 105 is now used to reduce the number of withdrawal tubes which is in turn connected to withdrawal syringes as shown in FIG. 17. This system uses multiple syringes for infuse and withdrawal, however a singular syringe with a larger manifold can also achieve the same task.

Figure 18:
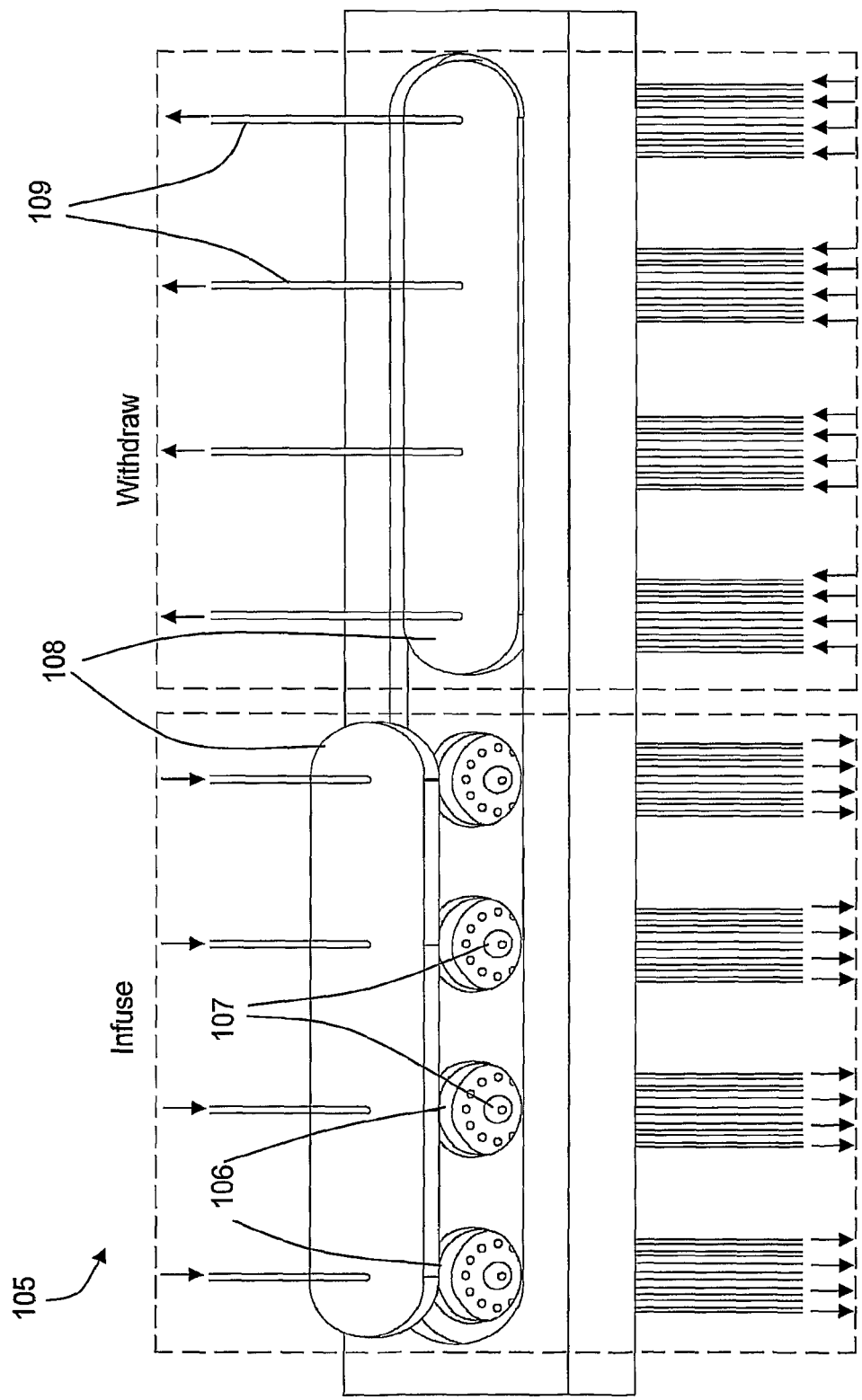
FIG. 18 shows a manifold used to convert fluid flow into multiple equal lines of fluid flow.

The manifold 105 is shown in more detail in FIG. 18. It is milled from polycarbonate. The tubing is cut square. Equal length tubing is inserted into holes in the manifold and are positioned flush with an inside chamber 106. A spare tube is inserted flush with the surface at an inverted cone section 107 of the chamber. This inverted cone collects the trapped air in the system and allows for the air to be drained via the spare tube. The tubes are then held in place with PDMS. Again the same mixing, pouring and curing method as in the queuing system are used. A cap array 108 with PEEK tubing flush with the inside surface is press fitted into the opposite end of the chamber. The cap is then fixed in place with epoxy encapsulant. This encapsulant is mixed as a two-part resin, degassed in a vacuum chamber and poured into the array plate cavity. The assembly is then cured in an oven at 50° C. for 1 hour. The cured encapsulant forms a solid seal to ensure no leaks occur to the chamber.

Syringes 109 are placed on top of the motor system and the manifold PEEK tubing is connected. The entire tubing array of the pumping system is primed prior to the tubes exiting from the manifold are connected to the queuing system. Priming the system involves driving fluid through the system and then draining the air from the system via the spare tubing in each chamber. This must be done before the pumping system is ever used. After the initial priming, the system should not need to be primed again unless air is trapped in the tubing. The same process must be then repeated. After the fluid has run through the system the flow is then withdrawn from the system back through the withdrawal manifolds, into the withdrawal syringes which are attached to another motor system for withdrawal. At present the infuse and withdrawal are powered by separate motors however since the infuse and withdrawal are at the same flow rate the same can be achieved from a single motor adapted to suite both infuse and withdrawal.

In summary, the pumping mechanism of FIGS. 16 and 17 pump oil through the manifolds 105, and from there into the system 70 of FIG. 14. Within this system the liquids are processed in a network such as illustrated in FIGS. 5 to 8.

Figure 19:
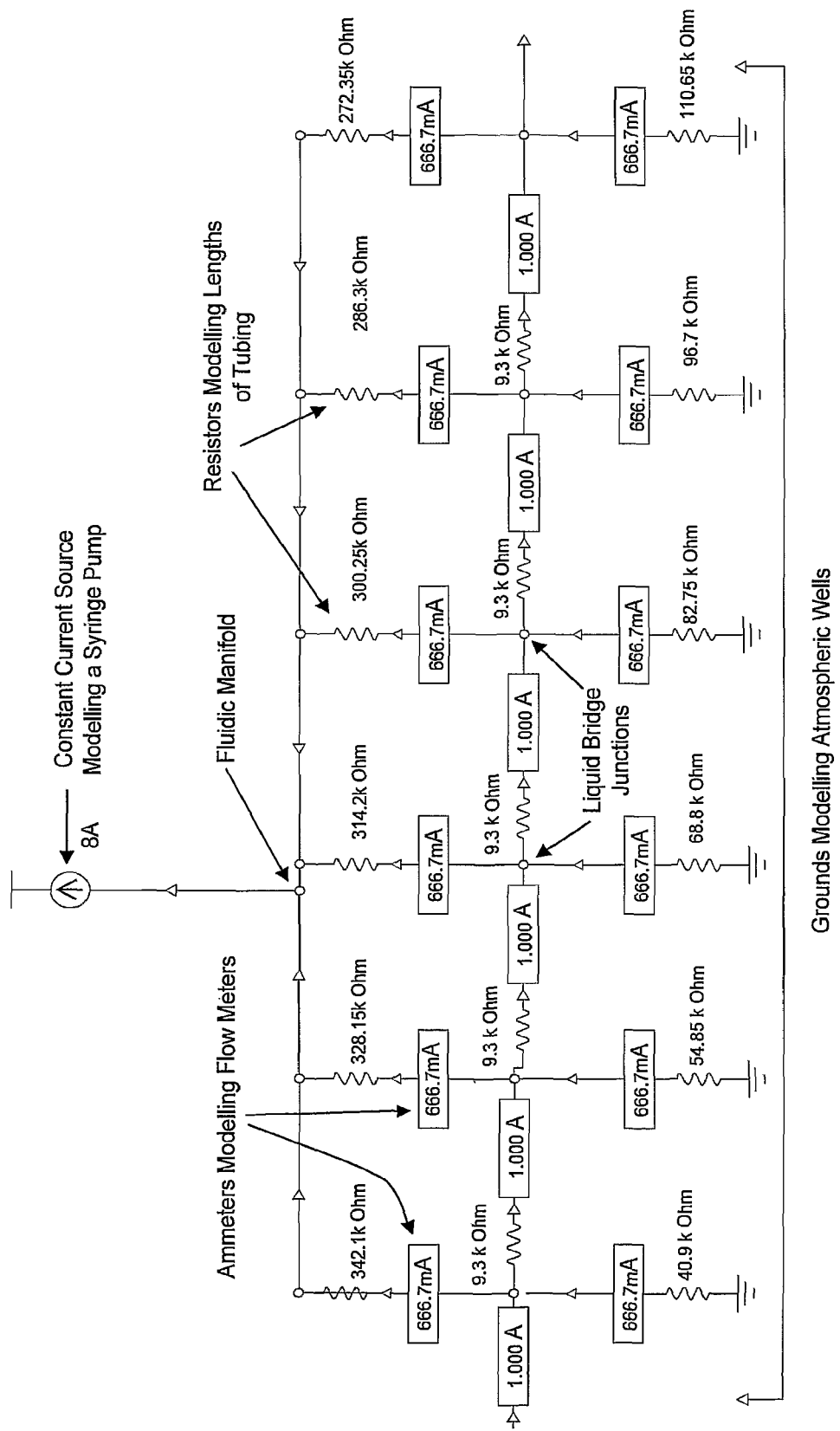
FIG. 19 is a diagram illustrating operation of electrical analysis software modelling microfluidic networks.

Referring to FIG. 19, a queuing system employing a pressurized source, or sources, to address multiple pressurized lines or wells may be modeled by drawing an electrical analogy with fluidic and geometric characteristics of the system.

The following may be regarded as equivalent electrical and fluidic parameters:

Electrical Resistance, R=Fluidic Resistance, $$\left(\frac{8\mu L}{\pi R^4}\right),$$

where $\mu$ denotes fluid viscosity, L the conduit length and R the conduit radius.

Electrical Current, I=Fluid Flowrate, Q.

Voltage Drop, $\Delta V$=Pressure Drop, $\Delta P$.

The electrical analogy permits the use of electrical engineering software to model a droplet network. Hence, electrical engineering software may be used to predict theoretically correct flowrates in every pressurized line within a microfluidic network. FIG. 19 presents a section of an electrical circuit used to model a microfluidic network. The correct selection of electrical resistance within each branch of the circuit may be used to define appropriate lengths and radii of conduits. For example, the tubing leading from the manifold to the upstream bridges needs to be longer than that leading to downstream bridges, in proportion to the lower resistances illustrated.

It will be appreciated that a network of the invention allows for a queue of aqueous droplets to be formed with a different chemical composition in each droplet. Serial line of bridges can be arranged in parallel to give a high throughput. A network may have a segmenter so that plugs of aqueous phase are formed upstream of the queuing devices Also, liquid bridge mixers may be provided downstream of each serial line for adding chemical or biological samples to the queued droplets. A network may be fed from a small number of wells through a manifold to give a queue of droplets which differs from the one given above, for example, with every other droplet having a different chemistry. The network may be manufactured to have a simple geometry of bridges that can be connected together in a variety of ways with interconnecting circular tubing.

The invention is not limited to the embodiments described but may be varied in construction and detail. It will be appreciated by persons skilled in the art that variations and/or modifications may be made to the invention without departing from the scope of the invention.

The invention claimed is:

1. A method for managing a queue of droplets in a network, the method comprising:
    delivering a sequence of droplets flowing in a carrier liquid to at least one junction, wherein the at least one junction comprises:
        at least one sample inlet, wherein the sequence of droplets and carrier liquid enter the junction;
        at least one carrier liquid inlet wherein additional carrier liquid enters the junction;
        a first carrier liquid outlet wherein the sample and carrier liquid exit the junction;
        a second carrier liquid outlet wherein only carrier liquid exits the junction;
    withdrawing carrier liquid from the junction through the second carrier liquid outlet;
    withdrawing the sequence of droplets and carrier liquid from the junction through the first carrier liquid outlet,
    wherein the exiting sequence of droplets are sufficiently separated.

2. The method of claim 1 wherein the junction is a liquid bridge.

3. The method of claim 1 wherein the method further comprises delivering a sequence of droplet through more than one junction.

4. The method of claim 3, wherein the more than one junctions are in series.

5. The method of claim 3, wherein the more than one junctions are in parallel.

6. The method of claim 1 wherein the carrier liquid is an oil.

7. The method of claim 1 wherein the second carrier outlet is a compensation outlet.

8. The method of claim 1 wherein carrier liquid enters the junction from the carrier liquid inlet and exits the carrier liquid outlet at the same rate.

9. The method of claim 1 wherein the method includes processing the sequence of droplets.

10. The method of claim 9 wherein the processing includes thermal cycling the droplet.

11. The method of claim 9 wherein the processing includes analyzing a droplet of the sequence of droplets for the presence or absence of a target nucleic acid.

12. A method of forming droplets having varying chemistries comprising:
    delivering a first sequence of droplets flowing in a carrier liquid to a first junction wherein the first junction comprises:
        at least one sample inlet, wherein the sequence of droplets and carrier liquid enter the junction;
        at least one carrier liquid inlet wherein additional carrier liquid enters the junction;
        a first carrier liquid outlet wherein the sample and carrier fluid exit the junction;
        a second carrier liquid outlet wherein only carrier fluid exits the junction;
    delivering a second sequence of droplets to a second junction wherein the second junction comprises:
        at least one sample inlet, wherein the sequence of droplets and carrier liquid enter the junction;
        at least one carrier liquid inlet wherein additional carrier liquid enters the junction;
        a first carrier liquid outlet wherein the sample and carrier fluid exit the junction;
        a second carrier liquid outlet wherein only carrier fluid exits the junction;
    adding a first primer to the first sequence of droplets at the first junction to form a first mixed droplet;
    adding a second primer to the second sequence of droplets at the second junction to form a second mixed droplet;
    withdrawing carrier liquid from the first junction and the second junction through the second carrier liquid outlet;
    withdrawing the sequence of droplets and carrier liquid from the first junction and the second junction through the first carrier liquid outlet
    flowing the first mixed droplet along a first path and
    flowing the second mixed droplet along a second path,
    wherein the first primer and the second primer are different primers, and wherein the carrier liquid entering the first junction and the second junction is withdrawn at the same rate.

13. The method of claim 12 wherein the first path and the second path are the same path.

14. The method of claim 12 wherein the first junction is a liquid bridge.

15. The method of claim 12 wherein the second junction is a liquid bridge.

* * * * *